Jan. 13, 1953 F. P. MARTIN 2,625,231
DRIVE AXLE MOUNTED FOR SWINGING AND ROCKING MOTION
Filed Aug. 23, 1950 5 Sheets-Sheet 1

Inventor
Fred P. Martin
By
Fishburn + Mullendore
Attorneys

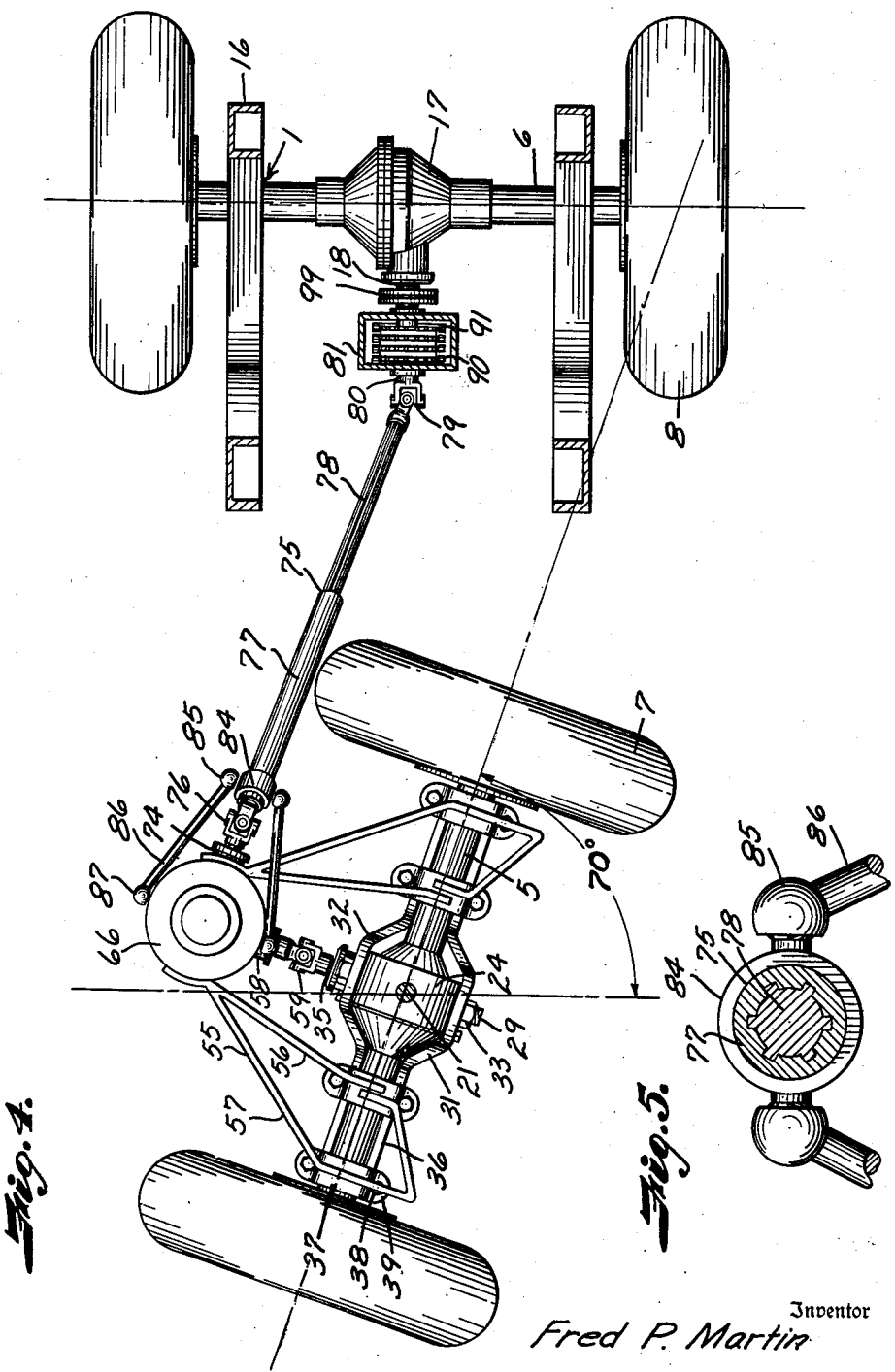

Jan. 13, 1953          F. P. MARTIN          2,625,231
DRIVE AXLE MOUNTED FOR SWINGING AND ROCKING MOTION
Filed Aug. 23, 1950          5 Sheets-Sheet 5
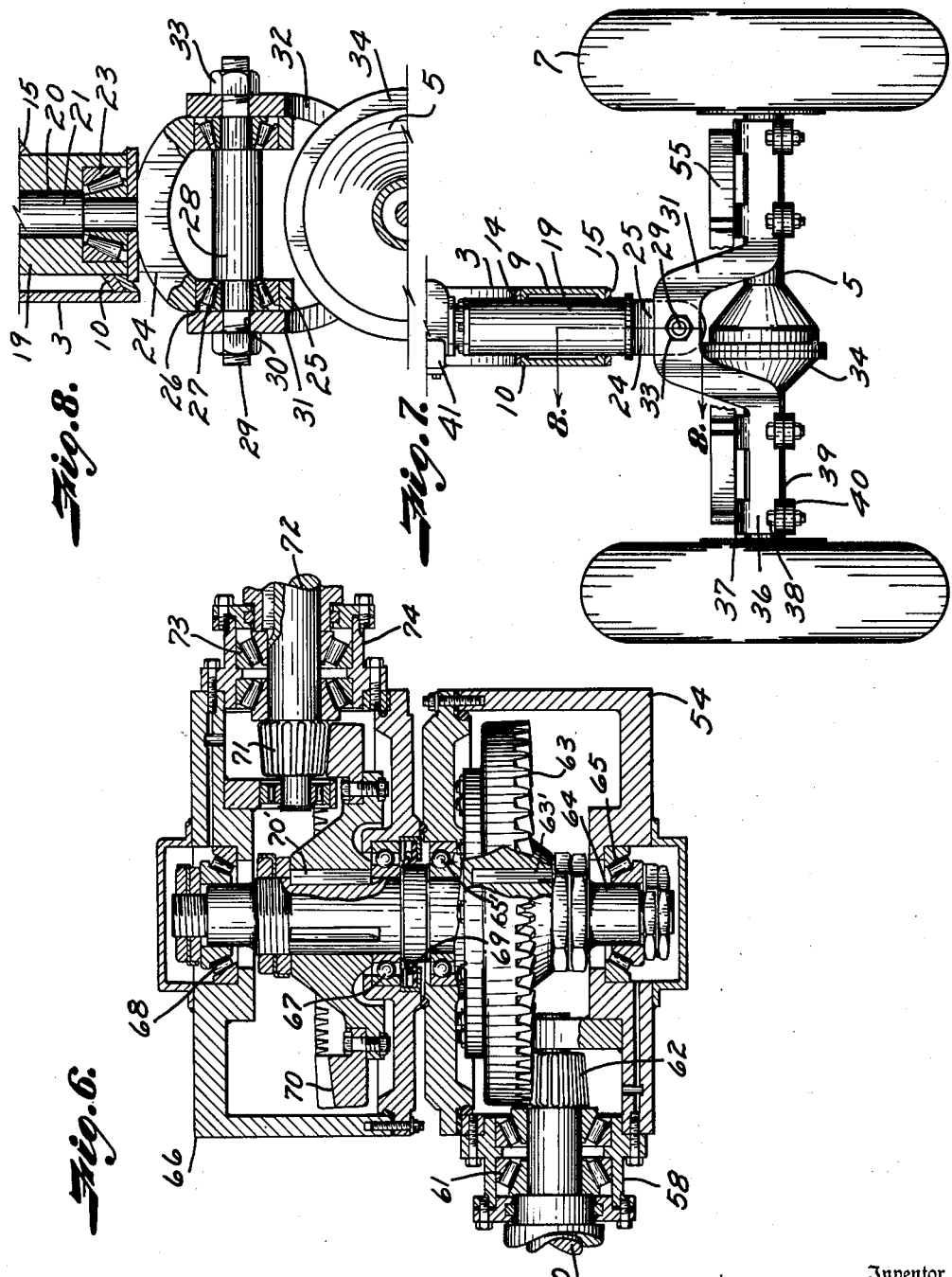
Inventor
Fred P. Martin
By
Fishburn + Mullendore
Attorneys Patented Jan. 13, 1953

2,625,231

UNITED STATES PATENT OFFICE 2,625,231

DRIVE AXLE MOUNTED FOR SWINGING AND ROCKING MOTION

Fred P. Martin, Topeka, Kans.

Application August 23, 1950, Serial No. 181,077

7 Claims. (Cl. 180—49)

This invention relates to power operated vehicles such as tractors having multiple axles and more particularly to a steered power driven axle mounting thereon for swinging and rocking movement and apparatus for delivering power from the engine to the road engaging wheels on said axle for propelling and steering the vehicle and effecting a directional drive of same over uneven ground.

The objects of the present invention are to provide a vehicle with a steered power-driven axle mounted for swinging and rocking movement thereon; to provide an all-wheel driven vehicle in which one axle is swingingly and rockingly mounted with relatively rotatable gear housings carried by the axle for imparting driving power thereto when said axle is turned to any angle up to the maximum steering angle at which the vehicle substantially turns about a point on which the inside rear wheel of the vehicle is located; to provide a power-driven vehicle axle which is mounted for rocking movement on a rotatable vertical shaft turned by power for swinging movement of the axle to steer the vehicle; to provide a plurality of gear housings relatively rotatable about a substantially vertical axis and carried by a power-driven steered axle with a telescoping drive shaft connected to mechanism for transmitting power thereto; to provide a mounting and power steering mechanism for a power-driven, swinging axle wherein the steering wheel is always moved in direct ratio to the steering movement of the axle; and to provide an all-wheel driven vehicle having an axle swingingly mounted whereby said axle is turned for steering, that is capable of easy maneuvering, short turning radius, high traction efforts, flexibility of operation on all types of terrain, positive in steering, and efficient, sturdy and economical to operate and maintain.

In accomplishing these and other objects of the present invention, I have provided improved details of structure, the preferred forms of which are illustrated in the accompanying drawings, wherein:

Fig. 4 is a horizontal cross-sectional view similar to Fig. 3 with the front axle swung to the maximum turning angle.

Fig. 5 is an enlarged transverse sectional view through the drive shaft on the line 5—5, Fig. 3.

Fig. 6 is an enlarged vertical sectional view through the relatively rotatable gear housings on the line 6—6, Fig. 3.

Fig. 7 is a front elevation of the front axle mounting.

Fig. 8 is an enlarged vertical sectional view through the front axle mounting on the line 8—8, Fig. 7.

Fig. 9 is a vertical sectional view taken on the line 9—9, Fig. 3, through the power transmission mechanism for delivering power from the engine to the drive shafts.

Figure 1:
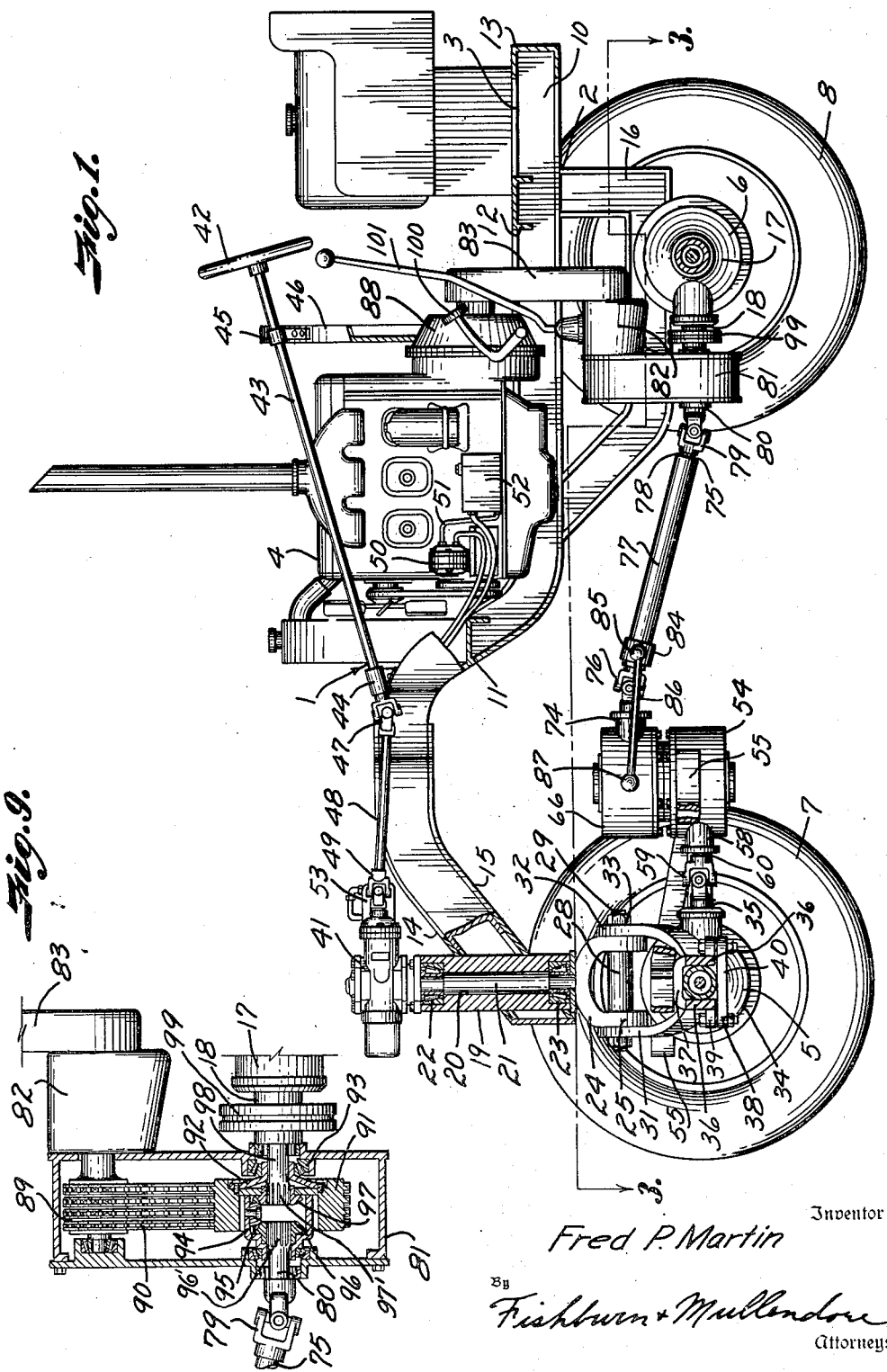
Fig. 1 is a side elevation of a vehicle embodying the features of the present invention and having portions broken away to better illustrate the parts therein.

Referring more in detail to the drawings:

1 designates a motor vehicle, such as a tractor, having a chassis 2 supported on a plurality of axles. In the form of the invention illustrated the chassis consists of a frame 3 carrying an engine 4 preferably on the portion intermediate the axles. The frame is supported on a front axle housing 5 and a rear axle housing 6, the axles being carried by wheels 7 and 8 respectively.

Figure 2:
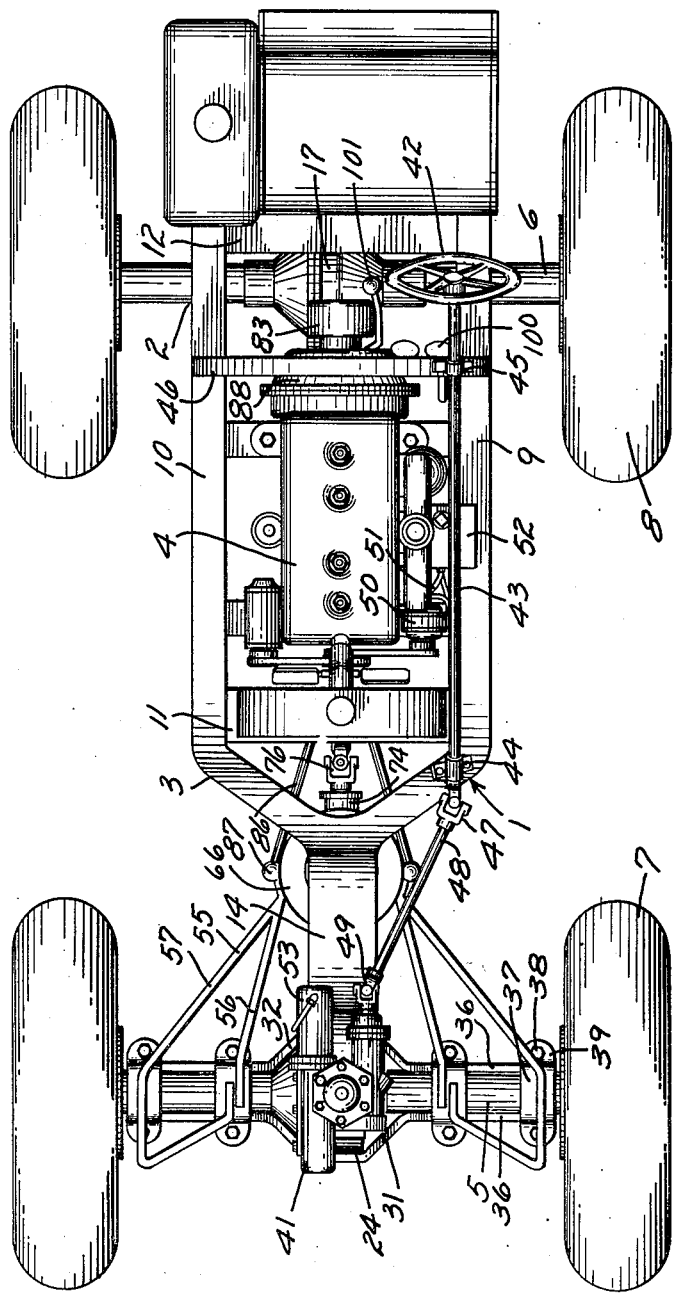
Fig. 2 is a plan view of the vehicle.

The frame 3 consists of spaced channel members 9 and 10 arranged longitudinally of the vehicle and connected by a plurality of transverse channel members 11, 12 and 13, the ends of which are suitably connected as by welding or the like to the longitudinal channel members. It is preferable that the longitudinal channel members 9 and 10 have a horizontal portion extending from the rear of the frame to approximately midway between the axles, said longitudinal members then sloping upwardly and inwardly, then forwardly and downwardly as illustrated in Figs. 1 and 2. In the forwardly and downwardly extending portions, it is preferable that the channels be parallel and slightly spaced with upper and lower plates 14 and 15 suitably secured to the flanges to form a box-like structure. This upward sweep of the frame is such as to provide clearance for the front wheels to pass under the frame when swung to extreme turning angles such as illustrated in Fig. 4. The axles 5 and 6 conform to well known design of commercial automobile or truck rear axles, except for slight alterations and additions as become necessary to adapt the same for the use herein exemplified.

No brake mechanism is illustrated as such mechanism may be conventional and forms no part of the invention.

The rear portions of the longitudinal frame members 9 and 10 are each provided with downwardly extending, suitably braced legs 16, the lower ends of which are suitably secured to the axle housing 6 to rigidly fix the rear axle housing transversely of the frame 3. The rear axle housing 6 includes a gear housing 17 for enclosing suitable differential gearing, substantially the same as conventional automotive bevelled gear differential structures, and has a forwardly extending pinion gear shaft 18 which is connected as later described to a power transmission mechanism for driving the rear wheels of the vehicle.

A bearing housing 19 is vertically arranged adjacent the forward end of the frame 3 between the channel members 9 and 10 and suitably secured thereto as by welding or the like. The bearing member has a vertical through bore 20, through which extends a shank 21 rotatably mounted in antifriction bearings 22 and 23 suitably mounted adjacent the upper and lower ends of the bearing housing 19. The bearings 22 and 23 preferably are adjustable and also capable of carrying radial and thrust loads for substantially eliminating endwise and lateral movement of the shanks relative to the bearing housing 19. A yoke 24 is fixed on the lower end of the shank 21 and has spaced depending ears 25 provided with aligned bores 26 for suitably mounting antifriction bearings 27 which rotatably support a shaft 28 in such a manner as to substantially prevent lateral and endwise movement thereof. The shaft 28 has threaded extensions 29 on each end thereof which extend through aligned bores 30 of spaced axle members 31 and 32, suitable fastening devices, such as nuts 33, being threadedly mounted on the threaded extensions 29 for securing the axle members 31 and 32 to the shaft 28 whereby movement of said axle members rotates the shaft 28 in the bearings 27. Obviously the bearings 27 could be located in the axle members 31 and 32 and the shaft 28 fixed to the yoke ears 25 to provide the same result of rotatably mounting the axle members 31 and 32 relative to the yoke 24 for rotation about an axis that is perpendicular to the axis of the shank 21.

The axle housing 5 includes a gear housing 34 for enclosing suitable differential gearing substantially the same as conventional automotive bevelled gear differential structure and the same as the differential structure enclosed in the housing 17 of the rear axle housing, a rearwardly extending pinion shaft 35 being suitably mounted in the differential housing 34 and connected with the power transmission mechanism as later described. The axle members 31 and 32 preferably have bar portions 36 forwardly and rearwardly respectively of the axle housing 5 and preferably engaging said housing between the differential housing 34 and brake housings carried adjacent the outer ends of the axle housing. The bar portions 36 are preferably connected by spaced saddle members 37 extending over and resting on the axle housing to rigidly secure the axle members together, said axle members being rigidly secured to the axle housing by means of suitable fastening devices such as bolts 38 which extend through suitable apertures in ears 39 on the bar portions 36 and plates 40 extending under and engaging the axle housing.

The central portion of each of the axle members 31 and 32 preferably is offset upwardly and provided with greater spacing than the bar portions 36, as illustrated in Figs. 1 and 7, whereby said central portions and the apertures 30 therein are so positioned that the shaft 28 is spaced above the differential housing 34 sufficiently to provide clearance therebetween for rocking motion of the axle housing 5 about the axis of the shaft 28, which axis is perpendicular to the axis of the axle housing and is in a vertical plane midway between the front wheels 7. The upper end of the shank 21 extends into a steering gear assembly housing 41 removably mounted on the upper end of the bearing housing 19, said shank 21 being fixed to the steering gear mechanism contained in the housing 41, whereby operation of the steering gear will rotate the shank 21 and swing the axle housing 5 about the axis of the shank.

The steering gear assembly in the housing 41 is operated and controlled by a steering wheel 42 fixed on a shaft 43 rotatably mounted in suitable bearings 44 and 45 preferably mounted on the frame 3 and instrument panel 46 respectively. The forward end of the shaft 43 is connected by a universal joint 47 with a shaft 48, which in turn is connected by a universal joint 49 with the operating shaft of the steering gear mechanism in the housing 41, which includes a worm gear meshing with the gear segment fixed to the upper end of the shank 21 and suitable valves for controlling application of hydraulic pressure supplied by a pump 50 driven by the engine 4. Suitable conduits 51 are arranged whereby the pump 50 moves hydraulic fluid from a reservoir 52 and in accordance with the position of the valves as controlled by turning movement of the steering wheel 42, applies said hydraulic fluid pressure to a cylinder 53 for movement of a gear rack having meshing engagement with the segment on the shank 21 for assisting and facilitating the swinging movement of the axle housing 5.

The particular structure of the steering gear assembly is not illustrated as no invention is claimed in the steering gear per se, it being similar to steering gear mechanisms available on tractors and other road machinery. This steering gear is such that when turning pressure is applied to the steering wheel the hydraulic mechanism is effective to apply the power for turning the shank 21 and swinging the axle housing 5. The steering wheel 42 being positively connected through the worm and gear segment with the shank 21, turns at a predetermined ratio relative to the swinging movement of the axle housing 5 and regardless of the position to which the axle housing 5 is swung, the operator releasing the steering wheel 42 or ceasing to apply turning pressure thereto immediately stops the application of hydraulic pressure to the cylinder 53 and the hydraulic mechanism then merely holds the steering gear in the position to which it has been turned, thereby providing the operator with a positive control and feel of the steering or swinging movement of the front axle housing.

A gear housing 54 is arranged rearwardly of the differential housing 34 and is rigidly supported relative to the front axle housing 5 by arms 55. In the illustrated structure, the rear ends of the arms 55 are fixed to the housing 54 and each has branches 56 and 57 which diverge forwardly and are rigidly secured to the saddles 37 which connect the axle members 31 and 32. The housing 54 has an extension 58 extending forwardly thereof and in axial alignment with the shaft 35. The pinion shaft 35 in the differential housing 34 is connected by a suitable universal joint 59 with a pinion shaft 60 rotatably mounted in suitable bearings 61 carried by the housing extension 59. A bevelled pinion 62 is fixed on the shaft 60 and has meshing engagement with a bevel gear 63 which is fixed by a key 63' on a vertically arranged shaft 64 rotatably mounted in suitable bearings 65 and 65' in the housing 54. The shaft 64 extends from the housing 54 and preferably upwardly therefrom into a gear housing 66 having suitable antifriction bearings 67 and 68 for rotatably mounting the housing 66 relative to the shaft 64. The housings 54 and 66 and the gear mechanism therein are preferably substantially identical, with the housing 66 inverted relative to the housing 54 and a suitable oil seal 69 for preventing leakage of lubricant therebetween. A bevelled gear 70 in housing 66 is mounted on and fixed to the shaft 64 by a key 70', said gear 70 has meshing engagement with a bevelled gear pinion 71 fixed to a shaft 72 rotatably mounted in suitable antifriction bearings 73 carried in an extension 74 of the housing 66. With this arrangement rotation of the shaft 72 will drive the bevelled gear 70, rotating the shaft 64 and bevelled gear 63 thereon to drive the bevelled pinion 62 and shaft 60 to rotate the pinion shaft 35 and drive the differential gearing in the housing 34 for effecting rotation of the front wheels 7, this driving action being effective when the front wheels are swung about the axis of the shank 21 due to the housings 54 and 66 being relatively rotatable.

Figure 3:
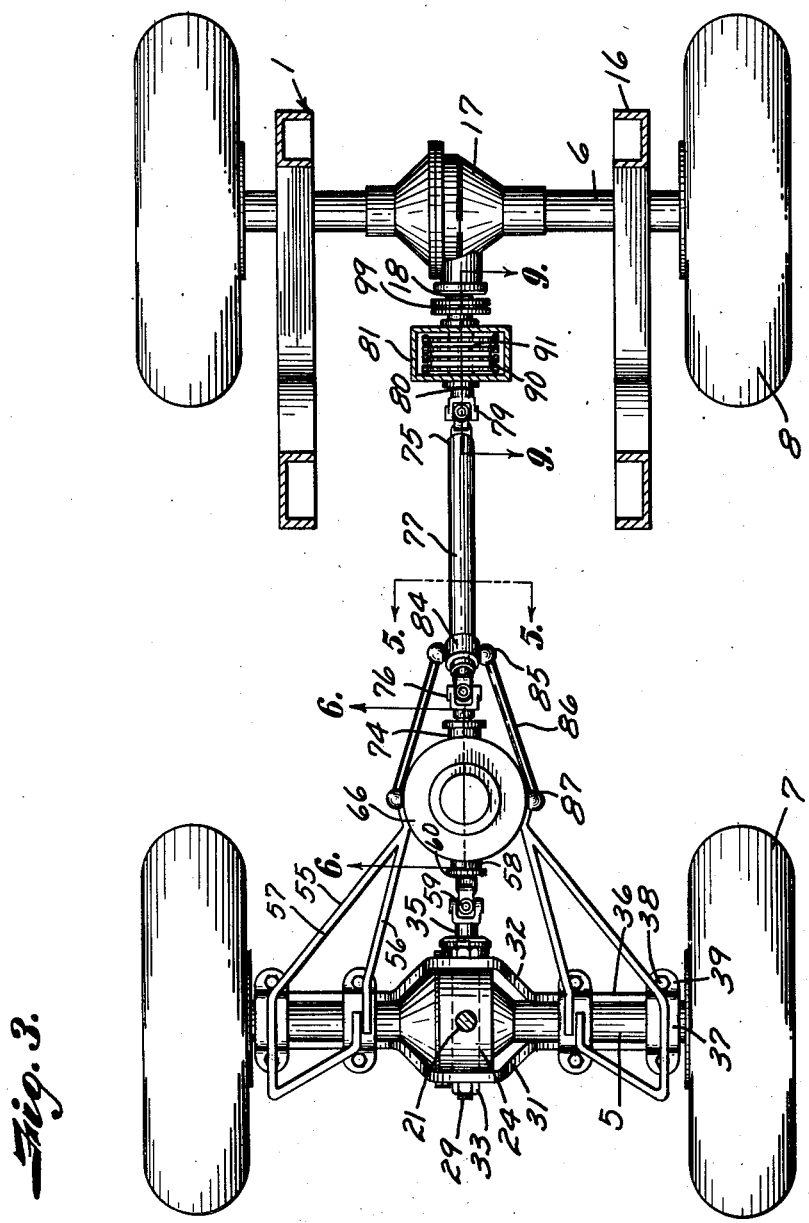
Fig. 3 is a horizontal cross-sectional view taken on the line 3—3, Fig. 1.

The rear end of the pinion shaft 72 is suitably connected to a drive shaft 75 by means of a suitable universal joint 76. The drive shaft 75 preferably consists of telescoping keyed members 77 and 78 to provide extension and contraction of said drive shaft. The rear end of the drive shaft 75 is connected by a universal joint 79 with a shaft 80 extending forwardly from adjacent the lower end of a housing 81 enclosing suitable transmission mechanism such as chains, sprockets and gears, operatively engaged to receive driving power from the conventional transmission enclosed in a housing 82 carried by the frame 3 and operatively connected with the drive shaft of the engine 4 by mechanism enclosed in the housing 83. This arrangement connects the engine, as later described, with the differential gearing in the axle housing 5 to deliver power thereto. Since the axle housing 5 is swingable about a vertical axis extending through the shank 21 and the gear housing 54 is rigidly fixed relative to the front axle housing 5, the gear housing 54 will swing about the axis of the shank 21. The gear housing 66 is rotatable relative to the gear housing 54 but must be held whereby the axis of the pinion shaft 72 is substantially in the same vertical plane as the axis of the drive shaft 75. This alignment is maintained by a collar 84 rotatably mounted on the forward end of the telescoping drive shaft member 77 and connected by ball and socket joints 85 with the rear ends of spaced links 86, the forward ends of which are connected by ball and socket joints 87 with the gear housing 66. This arrangement maintains suitable alignment of the pinion shaft 76 and drive shaft 75 during any position of the front axle housing 5, as shown in Figs. 3 and 4, and effects the driving rotation of the front wheels 7 in any of said positions up to as much as a swinging movement of substantially 70° from a plane transversely of the vehicle whereby the axis of the front axle is substantially in alignment with the point of contact of the inside rear wheel 8 with the surface on which the vehicle is operated, as shown in Fig. 4.

The engine 4 is preferably arranged and supported in the frame 3 with a suitable clutch in a housing 88 on the rear of said engine, whereby the drive shaft extending rearwardly from the clutch housing 88 extends into the housing 83 which is preferably positioned substantially over the rear axle housing 6. The transmission housing 82 encloses a conventional gear shift type of transmission mechanism and is positioned forwardly of the lower end of the housing 83 and is operatively connected with the engine drive shaft by suitable chains or other drive mechanism contained in the housing 83. The driven shaft from the transmission housing 82 extends into the upper end of the housing 81 and fixed thereto is a sprocket 89 operatively connected by chains 90 with a sprocket 91 carried on a spider 92 rotatably mounted on suitable bearings 93 whereby the axis of rotation of the sprocket 91 is in alignment with the axis of the shaft 80.

The spider 92 carries a suitable differential gearing 94 which includes bevelled pinions 95 meshing with gears 96 and 97, the gear 96 being keyed to the inner end of the shaft 80 by splines 96' and the gear 97 being keyed by splines 97' to the inner end of a shaft 98 which is in axial alignment with the shaft 80 and extends rearwardly from the housing 81. The rear end of the shaft 98 is connected by a flexible coupling member 99 with the pinion shaft 18 for driving the differential gearing in the rear axle housing 6 and rotating the wheels 8.

While gears and sprockets have been illustrated and described, obviously any suitable arrangement of gears or other conventional transmission equipment may be used which will deliver driving power to the shafts 80 and 98 with a differential action therebetween. Such conventional differential mechanism may be of the antislip type wherein driving action will be imparted to each of the wheels even though one may be on a slick surface and tend to rotate freely. This is also true of the differentials in the housings 17 and 34. The differential mechanism 94 provides for differential speeds of rotation of the shafts 80 and 92 and between the front and rear axles, thereby assuring proper driving contact with the ground by each wheel when the tractor is negotiating curves and the mean speed of rotation of the front wheels is different than the mean speed of rotation of the rear wheels.

In operating a device constructed as described, the engine 4 is started as in conventional motorized equipment, the clutch pedal 100 operated, the gear shift lever 101 moved to place the power transmission equipment in the proper gear and the clutch pedal let out to engage the clutch as in conventional practice. The power of the engine is delivered through the transmission mechanism in the housing 82 to rotate the sprocket 89, which through chain 90 drives the sprocket 91, rotating the differential mechanism 94. The pinions 95 and bevelled gears 96 and 97 transmit the rotation to the differential mechanism and effect differential rotation of the shafts 80 and 98 respectively, thereby driving the drive shafts 75 and 18, the drive shaft 18 transmitting propelling power through the differential gearing in the housing 17 to the rear wheels 8. The drive shaft 75 transmits propelling power through the gearing in the housings 66 and 54 and differential gearing in the housing 34 to deliver propelling power to the wheels 7. Through this arrangement power is applied to each of the wheels, making an all-wheel drive vehicle which will maintain ground engagement by the wheels when negotiating turns in which each wheel rotates at a different speed due to the different radii of the circles in which the wheels move. In forward movement of the vehicle over irregular terrain, different relative vertical positions of the rear wheels will effect tilting of the frame as the rear axle housing 6 is rigid therewith. The front wheels, however, assume different relative heights without tilting of the frame due to the rotatable mounting of the shaft 28 and the connection of said shaft with the axle members 31 and 32 and front axle housing 5. Therefore the front axle housing 5 may rock about the axis of the shaft 28 in a vertical plane transversely with the longitudinal center of the vehicle. While the engine 4 is operating, it is driving the pump 50, drawing hydraulic fluid from the reservoir 52 and maintaining a predetermined pressure at the hydraulic mechanism in the housing 41.

When it is desired to turn the vehicle, the steering wheel 42 may be turned, for example, to the left and the hydraulic mechanism in the housing 41 will turn the shank 21 to swing the axle housing 5 to the left about the axis of the shank 21. The turning movement will continue while the operator moves the steering wheel to the left maintaining turning pressure thereon, however, as soon as the turning pressure is released or the operator releases the steering wheel the swinging movement of the front axle will stop and the axle remain in that position until the steering wheel is again turned to the right or left.

When the front axle housing 5 is swung to the left, as illustrated in Fig. 4, the gear housing 54, being rigidly supported on said axle housing, swings therewith about the axis of the shank 21 and maintains alignment between the shafts 35 and 60. The gear housing 66 moves with the gear housing 54 but rotates relative thereto about the shaft 64. This movement of the gear housing 66 in an arc and laterally of the longitudinal center of the vehicle swings the forward end of the telescoping drive shaft laterally and effects extension thereof, the alignment of the drive shaft 75 and shaft 72 being maintained by the links 86 whereby propelling power is transmitted from the engine through the transmission mechanism to the drive shaft 75, shaft 72, gearing in the housings 66 and 54, and through the differential gearing in the front axle housing. The propelling power is transmitted in the same manner when the vehicle is turned over irregular terrain, whereby the front axle rocks about the axis of the shaft 28. As illustrated in Fig. 4, this directional power or drive is applied through the front wheels in any position of the front axle housing even to such extremes of turning of as much as 70° for the shortest possible turning radius of the vehicle. The upward sweep of the frame 3 provides clearance for passage of the front wheels 7 thereunder whereby the only limitation as to the extent of the turning or swinging movement of the axle housing 5 is the engagement of the wheels 7 with the telescoping drive shaft 75.

It is believed obvious that I have provided a motorized vehicle having a multiple number of axles in which all of the wheels are driven and one of the axles mounted for swinging and rocking movement while propelling power is applied thereto, with a steering mechanism for controlling the swinging of said axle for easy maneuvering, short turning radius and flexibility of operation on all types of terrain in an efficient, sturdy and economical apparatus.

What I claim and desire to secure by Letters Patent is:

1. In a motor vehicle having a frame, engine and transmission mechanism thereon, a driving axle housing having differential gearing and axles therein, means on the frame supporting the axle housing for turning and rocking movement, the turning movement being about a vertical axis, means for selectively turning said axle housing about said vertical axis, a plurality of gear housings relatively rotatable about a vertical axis spaced from the vertical axis of the axle housing, arms fixed on said axle housing and extending therefrom, said arms rigidly supporting one of said gear housings thereon in spaced relation to the axle housing for movement with said axle housing during turning and rocking thereof, operatively connected gears in the gear housings, means operated by the gears in the gear housing supported on the axle housing for driving said differential gearing in the axle housing, and means operatively connecting the transmission mechanism with the gearing in the other gear housing for driving same.

2. In a motor vehicle having a frame, engine and transmission mechanism thereon, a driving axle housing having differential gearing and axles therein, means on the frame supporting the axle housing for turning and rocking movement, the turning movement being about a vertical axis, means for selectively turning said axle housing about said vertical axis, a plurality of gear housings relatively rotatable about a vertical axis spaced from the vertical axis of the axle housing, arms fixed on said axle housing and extending therefrom, said arms being fixed to one of said gear housings for rigidly supporting said one gear housing on the axle housing in spaced relation thereto for movement with said axle housing during turning and rocking thereof, operatively connected gears in the gear housings, means operated by the gears in the gear housing supported on the axle housing for driving said differential gearing in the axle housing, a drive shaft having one end flexibly connected to the transmission mechanism, means flexibly connecting the other end of the drive shaft with the gearing in the other gear housing, and means on said other gear housing having engagement with the drive shaft for rotating said other gear housing and substantially maintaining alignment thereof with said drive shaft as the gear housing moves with the axle housing during turning and rocking movement thereof.

3. In a motor vehicle having a frame, engine and transmission mechanism thereon, a driving axle housing having differential gearing and axles therein, a vertically arranged shank, means rotatably mounting said shank in the frame for rotation about the vertical axis of said shank, means mounting said axle housing on the shank for rocking movement about an axis transversely of said axle housing, means connected to the shank for selectively turning said axle housing about said vertical axis, a plurality of gear housings relatively rotatable about a vertical axis spaced from the vertical axis of the shank, means for rigidly supporting one of said gear housings on said axle housing in spaced relation thereto for movement with said axle housing during turning and rocking thereof, operatively connected gears in the gear housings, means operated by the gears in the gear housing supported on the axle housing for driving said differential gearing in the axle housing, a drive shaft having one end universally connected to the transmission mechanism, means universally connecting the other end of the drive shaft with the gearing in the other gear housing, and means on said other gear housing having engagement with the drive shaft for rotating said other gear housing and substantially maintaining alignment with said drive shaft as the gear housing moves with the axle housing during turning and rocking movement thereof, said turning of the axle housing about the vertical axis thereof swinging the gear housing supported thereon in an arc to a position laterally of the longitudinal center of the vehicle.

4. In a motor vehicle having a frame, engine and transmission mechanism thereon, a driving axle housing having differential gearing and axles therein, a vertically arranged shank, means rotatably mounting said shank in the frame for rotation about the vertical axis of said shank, means mounting said axle housing on the shank for rocking movement about an axis transversely of said axle housing, steering mechanism connected to the shank for selectively turning said axle housing about said vertical axis, a plurality of gear housings relatively rotatable about a vertical axis spaced from the vertical axis of the shank, means for rigidly supporting one of said gear housings on said axle housing in spaced relation thereto for movement with said axle housing during turning and rocking thereof, operatively connected gears in the gear housings, means operated by the gears in the gear housing supported on the axle housing for driving said differential gearing in the axle housing, a telescoping drive shaft having one end universally connected to the transmission mechanism, means universally connecting the other end of the telescoping drive shaft with the gearing in the other gear housing, and means on said other gear housing having engagement with the telescoping drive shaft for rotating said other gear housing and substantially maintaining alignment with said telescoping drive shaft as the gear housing moves with the axle housing during turning and rocking movement thereof.

5. In a motor vehicle having a frame, engine and transmission mechanism thereon, a driving axle housing having differential gearing therein and ground engaging wheels operatively connected thereto, a yoke including a shank, means on the frame rotatably mounting the shank for rotation about a vertical axis, means mounting the axle housing on the yoke for rocking movement transversely of said axle housing, steering mechanism on the frame and operatively connected to the shank for selectively turning the axle housing about the vertical axis thereof, a pair of gear housings, one above the other and relatively rotatable about a vertical axis spaced from the axis of the shank, means on said axle housing rigidly supporting one of said gear housings thereon in spaced relation thereto whereby said gear housing moves with said axle housing in turning and rocking movement thereof, operatively connected gears in the gear housings, means operated by the gears in the gear housing supported on the axle housing for driving the differential gearing therein, a drive shaft, means universally connecting one end of the drive shaft to the transmission mechanism, and means operatively connected with the gears in the other gear housing and universally connected with the other end of the drive shaft.

6. In a motor vehicle having a frame, engine and transmission mechanism thereon, a driving axle housing having differential gearing therein and ground engaging wheels operatively connected thereto, a yoke including a shank, means on the frame rotatably mounting the shank for rotation about its vertical axis, means mounting the axle housing on the yoke for rocking movement about an axis transversely of said axle housing, power steering mechanism on the frame and operatively connected to the shank for selectively turning the axle housing about the vertical axis thereof, a pair of gear housings, one above the other and relatively rotatable about a vertical axis spaced from the axis of the shank, means on said axle housing rigidly supporting one of said gear housings thereon in spaced relation thereto whereby said gear housing moves with said axle housing in turning and rocking movement thereof, operatively connected gears in the gear housings, means operated by the gears in the gear housing supported on the axle housing for driving the differential gearing therein, a drive shaft, means universally connecting one end of the driveshaft to the transmission mechanism, means operatively connected with the gears in the other gear housing and universally connected with the other end of the drive shaft, and means on said other gear housing and engaging the drive shaft for turning said other gear housing and maintaining alignment therebetween as the gear housing moves with the axle housing during turning and rocking movement thereof.

7. In a motor vehicle having a frame, engine and transmission mechanism thereon, a front driving axle housing having differential gearing therein and ground engaging wheels operatively connected thereto, a yoke including a vertically arranged shank, means adjacent the front end of the frame rotatably mounting the shank for rotation about its vertical axis, means mounting the front axle housing on the yoke for rocking movement about an axis transversely of said axle housing, power steering mechanism on the frame and operatively connected to the shank for selectively turning the front axle housing about the vertical axis thereof, a drive shaft for the differential gearing in the axle housing and extending therefrom, a telescoping drive shaft, means universally connecting one end of the telescoping drive shaft to the transmission mechanism, a pair of gear housings, one above the other and relatively rotatable about a vertical axis spaced from the axis of the shank, means on one of the gear housings rigidly fixed to the front axle housing for supporting said gear housing in rearwardly spaced relation to the front axle housing whereby said gear housing moves with said front axle housing in turning and rocking movement thereof, operatively connected gears in the gear housings, means operated by the gears in the gear housing supported on the axle housing and universally connected to the drive shaft for the differential gearing for driving same, means operatively connected with the gears in the other gear housing and universally connected with the other end of the telescoping drive shaft, and means on said other gear housing and engaging the telescoping drive shaft for turning said other gear housing and maintaining alignment therebetween as the gear housing moves with the front axle housing during turning and rocking movement thereof.

FRED P. MARTIN.

REFERENCES CITED

The following references are of record in the file of this patent:

UNITED STATES PATENTS

| Number | Name | Date |
|---|---|---|
| 885,014 | Brightmore | Apr. 21, 1908 |
| 1,113,071 | Turner | Oct. 6, 1914 |
| 1,294,198 | Timberlake | Feb. 11, 1919 |
| 1,376,286 | Lingard | Apr. 26, 1921 |
| 1,646,131 | Barnes | Oct. 18, 1927 |

FOREIGN PATENTS

| Number | Country | Date |
|---|---|---|
| 3,461 | Great Britain | May 22, 1902 |
| 108,592 | Australia | Sept. 20, 1939 |
| 690,982 | Germany | May 11, 1940 |